No. 867,199.

PATENTED SEPT. 24, 1907.

R. E. JACK.
HANDLE HOLDER.
APPLICATION FILED OCT. 8, 1906.

Witnesses
H. W. Walber
F. E. Hickey

Robt. E. Jack, Inventor
By George Setmore Call
Attorney

UNITED STATES PATENT OFFICE.

ROBERT E. JACK, OF MILWAUKEE, WISCONSIN, ASSIGNOR, BY MESNE ASSIGNMENTS, TO MAGIC BROOM-HOLDER COMPANY, A PARTNERSHIP.

HANDLE-HOLDER.

No. 867,199.     Specification of Letters Patent.     Patented Sept. 24, 1907.

Application filed October 8, 1906. Serial No. 337,918.

*To all whom it may concern:*

Be it known that I, ROBERT E. JACK, of Milwaukee, Wisconsin, have invented a Handle-Holder, of which the following is a specification.

This invention consists of a device for suspending by the handle various utensils having stick handles, such as brooms, brushes, carpet-sweepers, mops, spades, shovels, hoes, and the like, and my object is to provide a device of this sort which will readily grasp and tightly hold the handle of the implement, when thrust thereinto, and which can be manufactured and sold at a minimum price.

The invention is illustrated in the accompanying drawing, wherein

Figure 1:
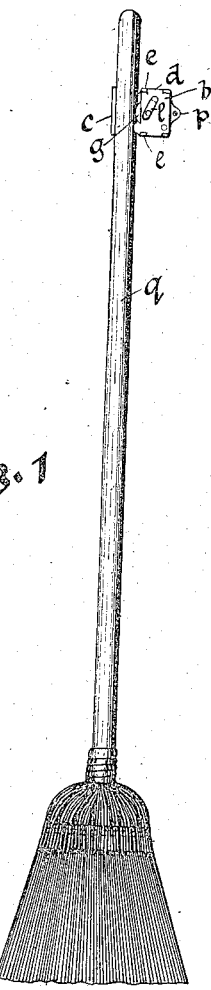
Figure 2:
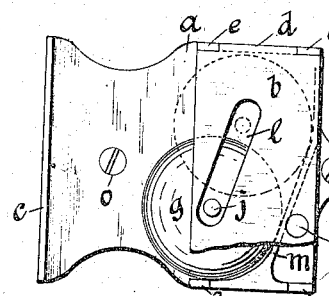
Figure 3:
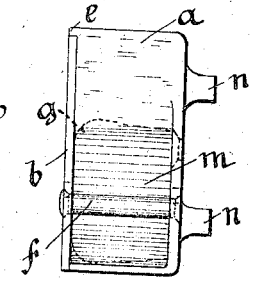
Figure 4:
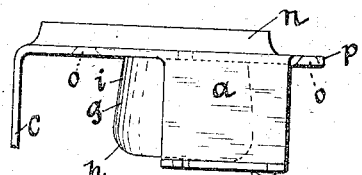
Figure 5:
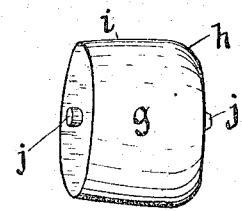

Figure 1 is a side-view of the holder as attached to a wall, showing a broom suspended therein. Fig. 2 is a side elevation of the holder on a larger scale, a part of the cover plate being broken away. Fig. 3 is a side elevation of the same. Fig. 4 is a plan view of the same. Fig. 5 is a perspective view of the roller.

In these drawings every reference letter and numeral refers always to the same part.

The invention consists of a box or casing $a$, one-half of which (the right-hand half in the drawing) is closed by a cover-plate $b$, while the left-hand half has on its outer edge a flange $c$. The cover-plate $b$ engages the edge of the casing $a$ by means of interengaging snugs $d$ and $e$, and is held in position by a rivet or like fastening $f$. In the inclosed space so formed is mounted a roller $g$, which is of the form shown more particularly in Fig. 5, to wit, having the outer corner $h$ rounded, and its periphery $i$ is slightly conical; and it carries a pair of axial gudgeons $j$, which engage in oblique slots $l$ in the casing $a$ and cover-plate $b$. The slots $l$ are merely to hold the roller in place, and are not intended to guide the latter (though they might be so made), an oblique plate $m$ constituting the right-hand side of the casing being arranged for this purpose, so that the roller $g$ roll sup and down on the plate. The casing $a$ has lugs $n$ at the back, which hold it at a distance from the wall, and a pair of screw-holes $o$ for attachment, one formed in the open part of the casing $a$ and the other in the ear $p$ on the right-hand side.

The reason for having the roller of a conical or tapering form is to enable it to quickly grip any implement-handle thrust into the holder, even if the latter is not pushed all the way in, and to enable it to take handles of a widely varying size which is not possible with a ball roller. The front edge $h$ is easier raised by the handle when rounded than if it were made sharp.

The mode of using the holder is apparent. It is attached to the wall in the position shown in Fig. 1, and the handle $q$ of the broom or other implement is thrust into the open slot or space between the flange $e$ and roller $g$ with a slight upward movement, in such manner that the roller $g$ is pushed upward frictionally, until the handle enters the said space. On releasing it the force of gravity acting on the handle and roller together causes the former to be jammed against the flange $c$, and positively supported.

I do not wish it understood that my invention is limited to the use of all the above described features and constructions, for some may be omitted and others may be varied or modified in various ways within the scope of the claims, as will readily occur to those skilled in the art.

Having thus described my invention, what I claim as new and desire to secure by Letters Patent is:

1. A handle-holder for brooms and like implements comprising a roller having a slightly conical surface, a casing in which said roller is mounted to move in a direction slightly oblique to the vertical, and an abutment opposite said roller.

2. A handle-holder of the class described comprising, in combination, a box or casing inclosed on one side, a roller mounted therein and guided in a direction slightly oblique to the vertical, and an abutment flange on the edge of the casing opposite said roller; said roller having a rounded front edge and tapering toward the back to a slightly smaller diameter.

3. A handle-holder comprising a casing having a portion closed at front and back, one of the closed sides having an oblique slot, a roller having a gudgeon running in said slot and an abutment opposite said roller; the plane of said abutment and the axis of said roller being perpendicular to the back, and said abutment and roller being separated at the front to permit the insertion of a handle.

4. A handle-holder comprising a casing having a portion thereof closed at front and back, oblique slots in said front and back, a roller having gudgeons running in said slots, and an abutment opposite said roller; the plane of said abutment and the axis of said roller being perpendicular to the back, and said abutment and roller being separated at the front to permit the insertion of a handle.

5. In a device of the class described, the combination of a casing having a partly inclosed portion, a cover plate fitting over the front side of said inclosed portion, and having an oblique slot therein, a conical roller loosely mounted in said inclosed portion and having a gudgeon fitting in said slot, an oblique surface at one side of said roller on which it rolls, and an abutment at the opposite side of said roller and at a distance therefrom.

In witness whereof I have hereunto set my hand this sixth day of October, 1906.

ROBERT E. JACK.

In presence of—
   RICHARD J. BORDEN,
   GEORGE W. COLLES.